(12) United States Patent
Hoose et al.

(10) Patent No.: US 6,958,859 B2
(45) Date of Patent: Oct. 25, 2005

(54) GRATING DEVICE WITH HIGH DIFFRACTION EFFICIENCY

(75) Inventors: John Hoose, Fairport, NY (US);
Robert Frankel, Rochester, NY (US);
Evgeny Popov, Marseilles (FR);
Michel Nevière, Marseilles (FR)

(73) Assignee: Chromaplex, Inc., West Henrietta, NY (US)

( * ) Notice: Subject to any disclaimer, the term of this patent is extended or adjusted under 35 U.S.C. 154(b) by 409 days.

(21) Appl. No.: 10/211,072

(22) Filed: Aug. 2, 2002

(65) Prior Publication Data

US 2004/0021946 A1 Feb. 5, 2004

(51) Int. Cl.$^7$ .............................. G02B 27/44; G02B 5/18
(52) U.S. Cl. ...................... 359/566; 359/571; 359/572; 359/576
(58) Field of Search ................................ 359/566, 569, 359/571, 572, 576

(56) References Cited

U.S. PATENT DOCUMENTS

2002/0063962 A1 * 5/2002 Takada ........................ 359/569

OTHER PUBLICATIONS

D.Maystre, et al., "Gratings for tunable lasers: using multi-dielectric coatings to improve their efficiency", Appl. Opt., 19(18), pp. 3099–3102, 1980.*
J.Chandezon, et al., "Multicoated gratings: a differential formalism applicable in teh entire optical region", JOSA 72(7), pp. 839–846, 1982.*
M.D.Perry, et al., "High–efficiency multilayer dielectric diffraction gratings", Opt. Lett., 20(8), pp. 940–943, 1995.*

Chandezon, J. et al. Multicoated gratings: a differential formalism applicable in the entire optical region. *Opt. Soc. Am.* 72, 839–846 (Jul. 1982).

Cianci, E. et al. Micromachined silicon grisms: high resolution spectroscopy in the near infrared. *Microelectronic Engineering* 53, 543–546 (2000).

Kleemann, B. & Guther, R. Metal gratings with dielectric coating of variable thickness within a period. *J. Modern Optics* 38, 897–910 (1991).

Loewen, E.G. et al. Grating efficiency theory as it applies to blazed and holographic gratings. *Applied Optics* 16, 2711–2721 (Oct. 1977).

Mashev, L. & Loewen, E.G. Anomalies of all–dielectric multilayer coated reflection gratings as a function of groove profile: an experimental study. *Applied Optics* 27, 31–32 (Jan. 1, 1988).

Mashev, L. & Popov, E. Diffraction Efficiency Anomalies of Multicoated Dielectric Gratings. *Optics Comm.* 51, 131–136 (Sep. 1, 1984).

Mashev, L. & Popov, E. Zero Order Anomaly of Dielectric Coated Gratings. *Optics Comm.* 55, 377–380 (Oct. 15, 1985).

Maystre, D. et al. Gratings for tunable lasers: using multi-dielectric coatings to improve their efficiency. *Applied Optics* 19, 3099–3102 (Sep. 15, 1980).

(Continued)

*Primary Examiner*—Drew Dunn
*Assistant Examiner*—Leo Boutsikaris
(74) *Attorney, Agent, or Firm*—Ropes & Gray LLP (57) ABSTRACT

A grating structure with a dielectric coating is disclosed that operates efficiently away from the blaze angle in low order with a high diffraction efficiency and high wavelength dispersion. Such grating structure can be employed in Littrow configuration to provide, for example, cavity feedback in excimer lasers.

10 Claims, 5 Drawing Sheets

OTHER PUBLICATIONS

Perry, M.D. et al. High–efficiency multilayer dielectric diffraction gratings. *Optics Letters* 20, 940942 (Apr. 15, 1995).

Thermo RGL (Richardson Grating Laboratory). The Blaze Arrow. Technical Note 7, 1–4 (1996–2002) cited on http://www.gratinglab.com/library/techNotes/techNote7.asp. Jul. 8, 2002.

Thermo RGL. Efficiency Characteristics of Diffraction Gratings. *Diffraction Grating Handbook*. Chapter 9, 1–18 (2002) cited on http://www.gratinglab.com/library/handbook5/chapter9.asp. Jul. 8, 2002.

Thermo RGL. Laser Tuning with Diffraction Gratings. Technical Note 1, 1–5 (1996–2002) cited on http://www.gratinglab.com/library/techNotes/techNote1.asp. Jul. 8, 2002.

* cited by examiner

GRATING DEVICE WITH HIGH DIFFRACTION EFFICIENCY

FIELD OF THE INVENTION

The invention relates to optical gratings, and more particular to an efficient grating device operating away from the blaze angle in low order with a high diffraction efficiency and high wavelength dispersion.

BACKGROUND OF THE INVENTION

Excimer lasers operating at 193 nm and 248 nm are increasingly used as light sources for mask exposure in semiconductor manufacturing to decrease the feature size of integrated circuits. This allows more circuit elements per circuit area and increases wafer throughput in the factory thus reducing overall costs. To further enhance the rendition of the mask features, the lasers line is narrowed to produce very narrow spectral ranges, typically 10 picometers or less. Diffraction gratings, in particular echelle gratings are used to this end. The disadvantage of the echelle gratings is their low damage threshold to laser radiation which limits their useful service life, and their low diffraction efficiency at steep angles of incidence (in the order of 78°), resulting in substantial replacement costs.

Traditional gratings employed for wavelength-selective feedback in laser cavities are generally replica gratings, where the groove structure is an epoxy type of material overcoated with a metal (typically aluminum for operation in the ultraviolet), and possible overcoated with a thin layer of a dielectric (typically magnesium dioxide) to suppress aluminum oxide buildup. The purpose of the dielectric overcoat in this case is to help prevent the formation of aluminum oxide that degrades ultraviolet reflectivity. In some cases, original holographic gratings are used where the groove structure is formed in photo-active materials such as photoresist, however, this type of grating is difficult to overcoat with dielectric materials since it cannot withstand the high temperatures required to make a durable multilayer dielectric.

The distribution of incident field power of a given wavelength diffracted by a grating into the various spectral order depends on many parameters, including the power and polarization of the incident light, the angles of incidence and diffraction, the (complex) index of refraction of the metal (or glass or dielectric) of the grating, and the groove spacing. A complete treatment of grating efficiency requires the vector formalism of electromagnetic theory (i.e., Maxwell's equations), which has been studied in detail over the past few decades. The maximum efficiency of a grating is typically obtained with a simple smooth triangular groove profile, when the groove (or blaze) angle $\delta$ is such that the specular reflection angle for the angle of incidence is equal (in magnitude and opposite in sign) to the angle of diffraction. Ideally, the groove facet should be flat with smooth straight edges, and be generally free from irregularities on a scale comparable to the small fraction (<1/10) of the wavelength of light being diffracted.

The distribution of power among the various diffraction orders depends on the shape of the individual grating grooves. Gratings are most efficient when light is specularly reflected into the diffracted beam, i.e., the grating appears to light up, or blaze, when viewed at the respective angle. This angle is called the blaze angle.

Grating efficiency typically falls off sharply away from the blaze angle in particular for high blaze angle gratings ($\Theta>40°$), with strong dependence on the direction of polarization.

The diffraction efficiency of gratings operating near the blaze angle can be enhanced by applying metal (e.g., aluminum) and/or dielectric coatings. Such multi-dielectric coatings for improving grating diffraction efficiency of holographic gratings for tunable lasers were reported by D. Maystre et al. (Applied Optics, Vol. 19, No. 18, 15 Sep. 1980, p. 3099–3102). The efficiency with 2 stacks of two dielectric films increased from 77% to 87% for a wavelength of $\lambda=0.64$ $\mu$m.

Chandezon et al. (J. Opt. Soc. America, Vol. 72, No. 7, pages 839–846 (1982)) reported a rigorous formalism for computing the diffraction efficiency of multi-coated sinusoidal gratings. The gratings were coated with a stack of two dielectrics, with each dielectric layer having an optical thickness of $\lambda/4$ at normal incidence for a wavelength of $\lambda=0.59$ $\mu$m. The thicknesses of the dielectrics were chosen to produce a minimum of absorption, as for a mirror.

Multilayer dielectric diffraction gratings produced by depositing a coating on optically flat substrates were reported by M. D. Perry et al. (Optics Letters, Vol. 20, No. 8, Apr. 15, 1995, p. 940–942. These gratings have a high diffraction efficiency and a high optical damage threshold at a wavelength of $\lambda=1053$ nm.

The reported dielectric-coated gratings, however, already have a relatively high diffraction efficiency without the applied coating. The coating further enhances the diffraction efficiency, which can be expressed by an empirical rule stating that each additional stack of $\lambda/4$ coatings results in a decrease of the absorption by a factor of 2. Therefore, if a grating has a diffraction efficiency of 90%, an additional stack would boost the efficiency to 95%, a further stack to 97.5%, and so on. However, none of the references suggests that the diffraction efficiency of ruled gratings, such as symmetric triangular gratings, can be increased by, for example, an order of magnitude, at wavelengths where the efficiency of uncoated or metal-layer coated gratings is so low as to render the gratings useless.

It would therefore be desirable to provide an easily manufacturable grating structure that operates at a low diffraction order and has a high diffraction efficiency and dispersion, in particular for UV laser applications.

SUMMARY OF THE INVENTION

The invention is directed to an efficient grating device operating away from the blaze angle in a low order with high diffraction efficiency and high wavelength dispersion.

According to an aspect of the invention, a grating device for efficient operation in Littrow or near-Littrow configuration includes a grating structure with grating facets and a grating period, and a multilayer dielectric coating disposed on the grating facets and having layers alternating between a first and second refractive index. The grating period is selected so half the grating period is substantially identical to the wavelength of the diffracted light beam times the order of diffraction, while the optical thickness of two successive layers of the multilayer dielectric coating at the angle of incidence is selected to be substantially identical to one half of the wavelength of the diffracted light beam.

Embodiments of the invention may include one or more of the following features. The grating structure can be a triangular grating structure and can include a flat section oriented substantially parallel to a major surface of the grating structure, said flat section disposed at an apex defined by adjacent grating facets. The grating structure can advantageously be made of a crystalline material, for example silicon, with the grating facets representing crystal planes of the crystalline material which can be easily etched using wet or reactive etching methods known in the art. The layers of the dielectric coatings can be made of a material that is optically transparent in the wavelength range of interest, such as $SiO_2$, $Si_3O_4$, $HfO_2$, as well as oxides, nitrides, oxinitrides and fluorides of other materials commonly used for optical coatings.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

Figure 6:
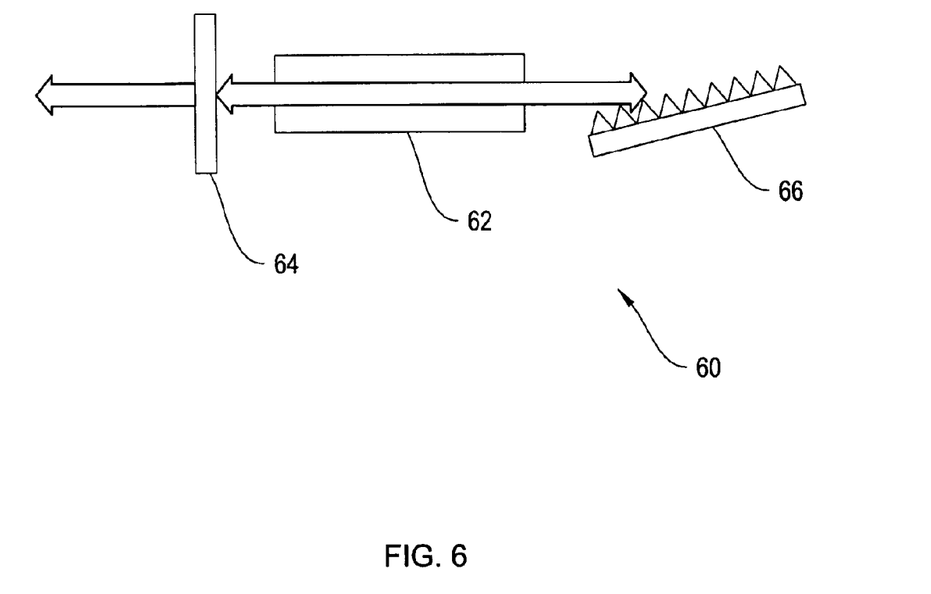
FIG. 6 shows schematically a laser with a Littrow grating reflector.

The invention is directed to gratings that operate efficiently in low order and at large diffraction angles different from the blaze angle, and more particularly to dielectric-stack coated diffraction gratings operating in Littrow configuration. Such gratings are useful for providing feedback in lasers Referring first to FIG. 6, a conventional laser cavity 60 includes a laser gain medium 62 that can be electrically or optically pumped. The pump is not shown. Optical feedback is provided by a partially reflecting output coupling mirror 64 and a wavelength tuning element 66, for example, a diffraction grating operating in Littrow configuration. As mentioned above, modern lithography tools expose, for example, photoresist to render feature sizes with linear dimensions of less than 0.1 µm, using excimer laser emitting at a wavelength of, for example, 193 nm or 248 nm.

Laser cavities that employ diffraction gratings as the wavelength tuning element suffer from low efficiency as the tuning angle approaches high angle values in the range of 80°. A high angle is beneficial for achieving high wavelength dispersion which in a Littrow configuration can be expressed as:

$$\frac{\partial \Theta}{\partial \lambda} = \frac{1}{\cos\Theta} * \frac{m}{d}, \quad (Eq. 1)$$

wherein $\Theta$ is the angle of incidence, m is the diffraction order and d is the grating period. As suggested by Eq. (1), the dispersion can be increased by operating the grating at a high diffraction order m and/or by having a small grating period d and/or by operating at almost grazing incidence ($\Theta \approx 90°$).

Figure 1:
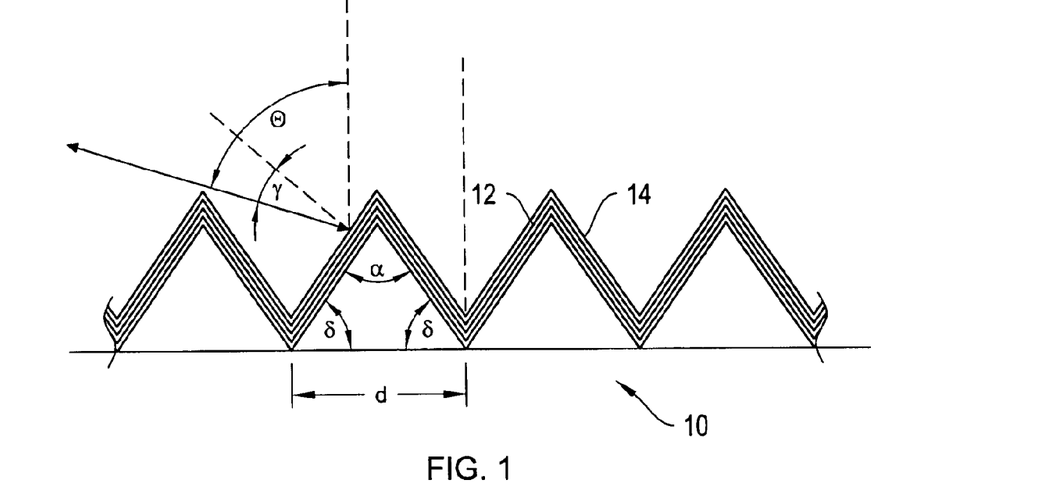
FIG. 1 is a schematic cross-sectional view of an ideal etched symmetric Si grating.

Referring now to FIG. 1, a grating 10 with a short grating period d can be easily etched in a (100) substrate by taking advantage of the natural etch planes 12, 14 of Si crystals. An etched grating of this type is symmetric and has a fixed apex angle $\alpha = 70.5°$ (which is equal to the angle formed between two (111) crystal etch planes) and a base angle $\delta = 54.75°$. Asymmetric gratings with a different base angle can be produced by cutting the Si crystal with a different orientation, as is known in the art. Chemical etches for Si that produce the described grating profiles are also known in the art. The base angle $\delta$ is equal to the blaze angle of the grating.

In Littrow configuration, an incident light beam impinges on the surface 12 of the grating 10 at an exemplary angle $\Theta$ of approximately 79° from the grating surface normal, and is diffracted at the same angle $\Theta = 79°$ angle from the grating surface normal along substantially the same optical path as the incident light beam. The incident and diffracted light beams enclose an angle $\gamma = \Theta - \delta = 24.25°$ with the normal to the groove facet 22, which is far off the blaze angle $\delta = 54.75°$. The exemplary angle of $\Theta = 79°$ is selected for illustrative purposes only, in particular, since no conventional gratings have so far been reported that operate with high efficiency at a large Littrow angle, and is not intended to be limiting in any way.

Figure 2:
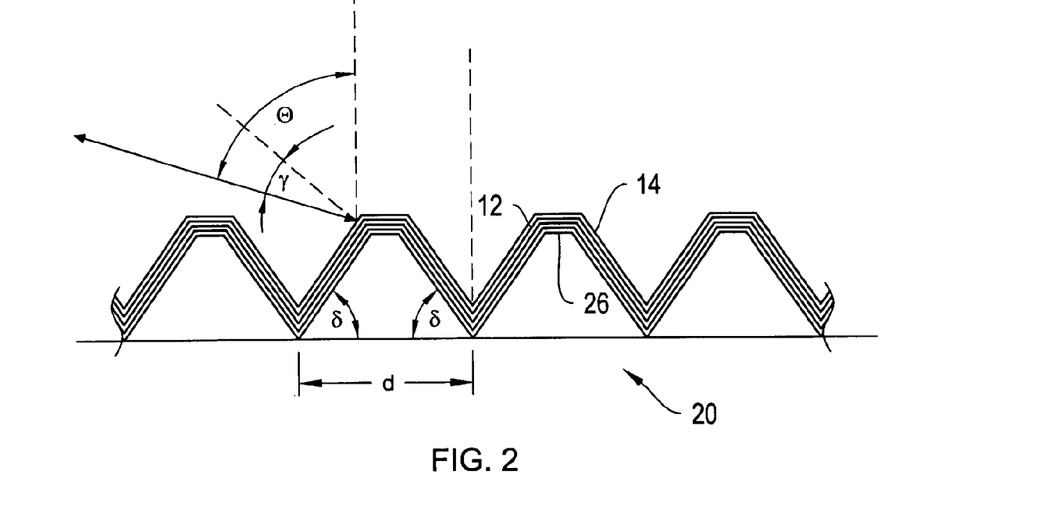
FIG. 2 is a schematic cross-sectional view of a realistic etched symmetric Si grating having a flat top section.

As shown in FIG. 2, the actual cross-sectional profile of an etched Si grating 20 tends to have a flat top section 26 with a width w produced by the non-ideal etch behavior of the chemical etch. Although the etch is preferential, it also etches surfaces other than (111), albeit at a slower etch rate. The angles $\alpha$, $\delta$, $\gamma$ and $\Theta$ in FIG. 2 are otherwise identical to those of FIG. 1. Exemplary grating performance will be described below with reference to both the ideal and the actual grating profiles of FIGS. 1 and 2.

Figure 3:
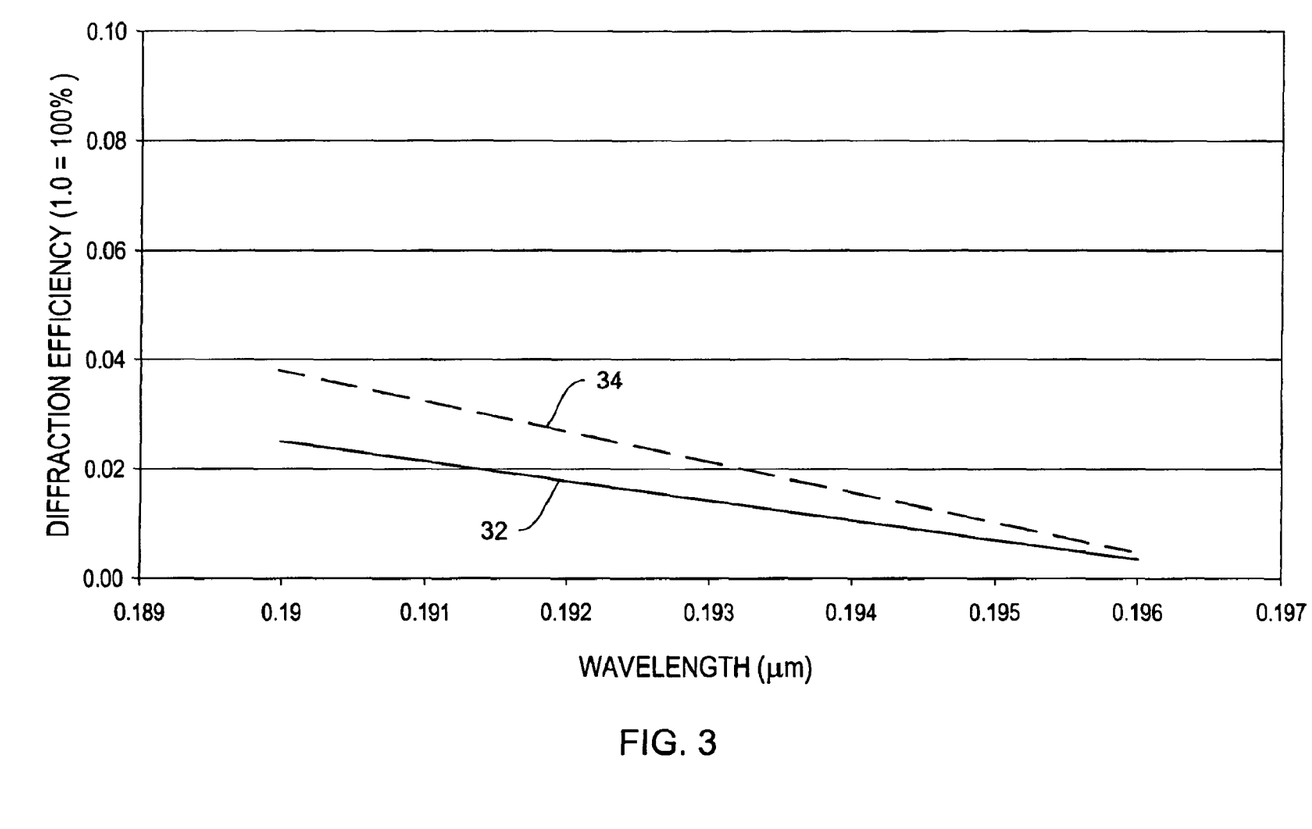
FIG. 3 shows the diffraction efficiency of an uncoated and an Al-coated Si grating operated in $2^{nd}$ order in Littrow geometry.

FIG. 3 shows the diffraction efficiency of a grating having the grating profile depicted in FIG. 2. Curve 32 is the diffraction efficiency of a bare Si grating having a grating period of 196.6 nm, a width w=40 nm of the flat region, and operating in Littrow configuration at an exemplary angle of incidence of 79°. The grating is designed to operate in $2^{nd}$ order at a wavelength of 193 nm. The grating period is substantially equal to the design wavelength (196.6 nm vs. 193 nm), so that the condition $0.5\lambda < d < 1.5\lambda$ is satisfied and the grating only generates two diffraction orders (n=1 and n=2). As evident from FIG. 3, the diffraction efficiency is less than 3% between 190 nm and 196 nm. Overcoating the grating with an Al layer improves the efficiency slightly to 4%. Such poor efficiency would make the grating useless for laser cavity tuning applications due to the round trip losses at the grating.

It has been found that the diffraction efficiency can be improved more than 30-fold at the exemplary design wavelength of 193 nm by applying over the surface of the grating a dielectric coating in form of a multilayer dielectric stack. Such dramatic improvement in diffraction efficiency has not been reported to date; most references report improvements of maybe 10–50%.

Figure 4:
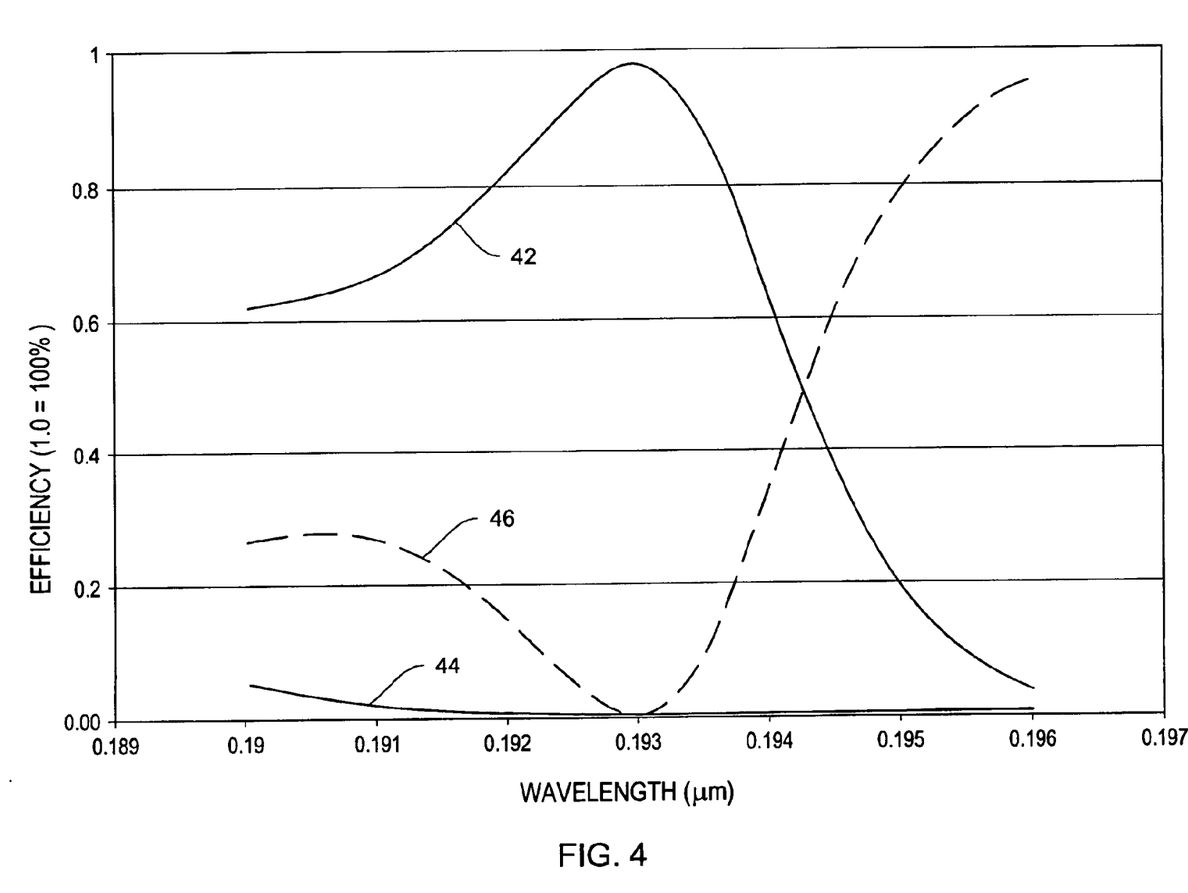
FIG. 4 shows the diffraction efficiency of a first embodiment of a dielectric-stack coated Si grating.

FIG. 4 shows curves of the diffraction efficiency of the grating of FIG. 1 over a wavelength range between 190 nm and 196 nm, which includes the desired lasing wavelength of 193 nm. The grating is made of Si and designed with a grating period d=196.6 nm (equivalent to 5086 g/mm) to provide $2^{nd}$ order diffraction at an angle of incidence of $\Theta = 79°$. The grating is coated with 4 stacks of $SiO_2$—$HfO_2$ layers and a final (top) layer of $SiO_2$. The layers have the physical parameters given in Table 1.

TABLE 1

| Layer | Refractive Index (n) | Layer thickness on facets (nm) |
| --- | --- | --- |
| 1 | 1.56 | 23.9 |
| 2 | 2.15 | 32.9 |
| 3 | 1.56 | 23.9 |
| 4 | 2.15 | 32.9 |
| 5 | 1.56 | 23.9 |
| 6 | 2.15 | 32.9 |
| 7 | 1.56 | 23.9 |
| 8 | 2.15 | 32.9 |
| 9 | 1.56 | 27.2 |

Curve 42 shows the $2^{nd}$ order diffraction efficiency which approaches 98% at $\lambda$=193 nm. The diffraction efficiencies for both the $0^{th}$ (curve 46) and the $1^{st}$ order (curve 44) are essentially zero at the design wavelength of 193 nm.

It can be seen that the combined optical thickness (n*d) of a single $SiO_2$—$HfO_2$ stack (for example, the stack made up of layers 1 and 2) is approximately 108 nm when corrected for the non-normal incidence of the optical beam on the grating facets, which is 0.56 times the free space wavelength of 193 nm, or slightly greater than $\lambda/2$.

Figure 5:
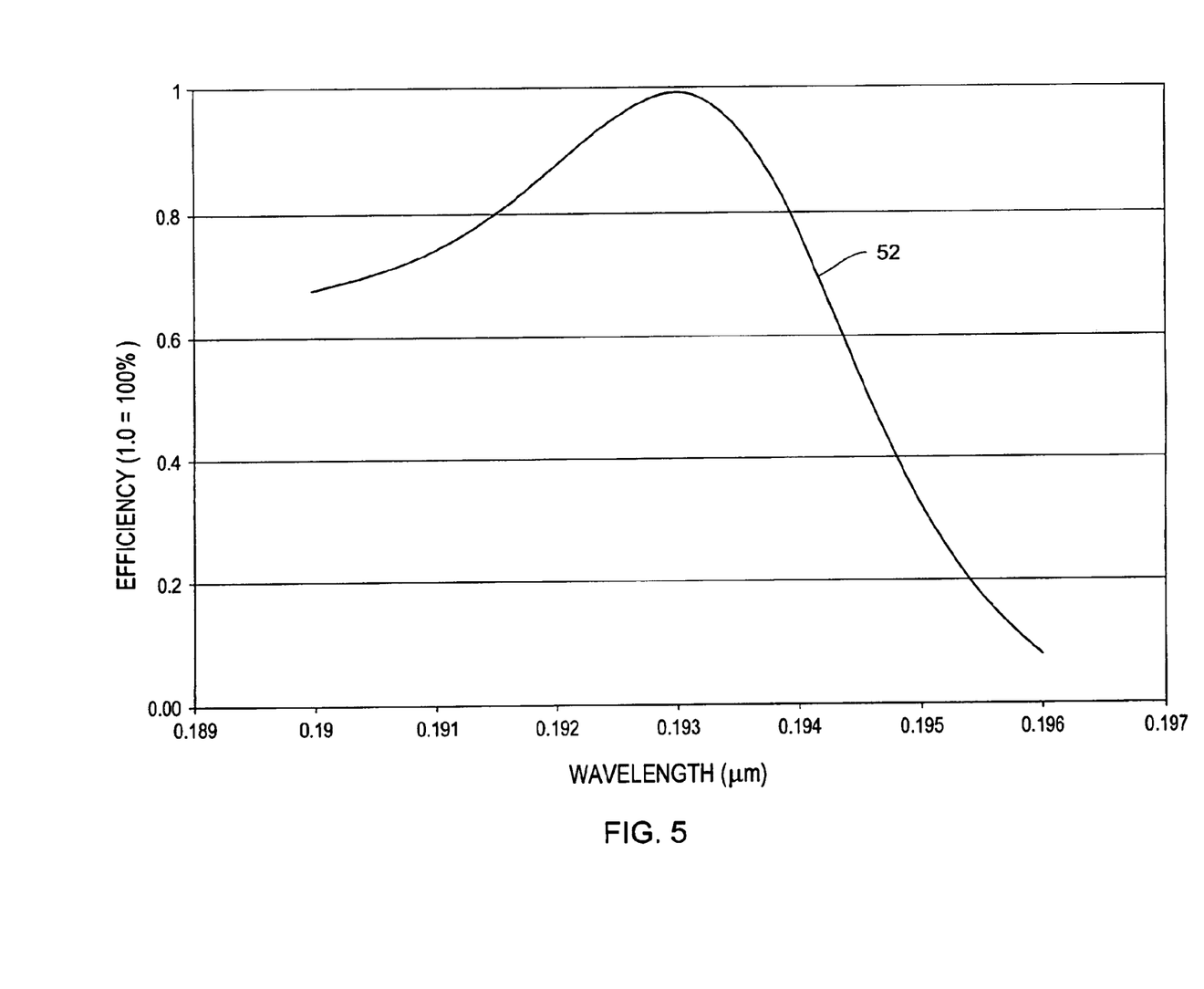
FIG. 5 shows the diffraction efficiency of a second embodiment of a dielectric-stack coated Si grating.

FIG. 5 shows curves of the diffraction efficiency of the grating of FIG. 2 over the same wavelength range between 190 nm and 196 nm. The grating of FIG. 2 has also the grating period d=196.6 nm (equivalent to 5086 g/mm), but has a 40 nm wide flat section at the apex. The grating is coated with 4 stacks of $SiO_2$—$HfO_2$ layers and a final (top) layer of $SiO_2$. The layers have the physical parameters given in Table 2.

TABLE 2

| Layer | Refractive Index (n) | Layer thickness on facets (nm) |
| --- | --- | --- |
| 1 | 1.56 | 26.7 |
| 2 | 2.15 | 32.2 |
| 3 | 1.56 | 26.7 |
| 4 | 2.15 | 32.2 |
| 5 | 1.56 | 26.7 |
| 6 | 2.15 | 32.2 |
| 7 | 1.56 | 26.7 |
| 8 | 2.15 | 32.2 |
| 9 | 1.56 | 27.1 |

The solid curve 52 shows the $2^{nd}$ order diffraction efficiency which exceeds 98% at $\lambda$=193 nm. As before, the diffraction efficiencies for both the $0^{th}$ and the $1^{st}$ order (not shown) are essentially zero at the design wavelength of 193 nm.

Although the thickness of the individual $SiO_2$ and $HfO_2$ layers indicated in Table 2 is slightly different from the thickness of the layers in Table 1, each single $SiO_2$—$HfO_2$ stack on the Si facet has again a combined optical thickness (n*d=111.6 nm) or 0.58 times the free space wavelength of 193 nm, which is again only slightly greater than $\lambda/2$ when corrected for the non-normal incidence of the optical beam on the grating facets.

A similar computation was performed for $4^{th}$ order diffraction of a grating profile of the type shown in FIG. 2, but having twice the grating period. The angle of incidence $\Theta$ (=angle of diffraction) was also selected to be =79°. Details of the results are not shown, but it should be mentioned that the calculated combined optical thickness (n*d=104.9 nm) of a stack formed of a $SiO_2$ layer and a $HfO_2$ layer is again 0.54 times the free space wavelength of 193 nm, or substantially identical to $\lambda/2$. The computed peak diffraction efficiency at then design wavelength of 193 nm was approximately 85% owing to the fact that energy is transferred into the lower order modes, which are also supported.

The computed diffraction efficiencies suggest that a multilayer dielectric stack composed of layer pairs, with a thickness of a layer pair of between approximately $0.9*\lambda$ and $1.2*\lambda$, preferably between $\lambda$ and $1.1*\lambda$, produces a dramatic increase of the diffraction efficiency of a grating operating far from the blaze angle in low order under almost grazing incidence.

The materials $HfO_2$ and $SiO_2$ selected in the above examples for the dielectric coating layers are representative only and other materials could be substituted with appropriate changes in the design parameters. For example, oxides, nitrides, oxinitrides and fluorides of group II elements, such as Mg and Ca, group III elements, such as Al, and group IV elements, such as Si, Ge, Zr, and Hf, can be used, as long as they are transparent in the wavelength range of interest. Advantageously, the thickness of the dielectric coating layers is insufficient to support waveguide effect which can result in unwanted Wood anomalies known in the art.

The grating described herein has the following advantages over conventional grating structures:

High-quality gratings with a small grating period can be fabricated from standard Si wafers, which significantly reduces cost. The gratings operate in a low ($2^{nd}$) order with high angular dispersion, which reduces the spectral bandwidth when operated in Littrow configuration at high angles of incidence. Higher damage threshold which extends the lifetime for the grating in a high-power laser application. Higher diffraction efficiency reduces the operating temperature of the grating.

While the invention has been disclosed in connection with the preferred embodiments shown and described in detail, various modifications and improvements thereon will become readily apparent to those skilled in the art. The grating device described herein, although designed for excimer laser use, can be altered to operate with similar design principles to operate at other wavelengths throughout the visible, ultraviolet, and near infrared regions, or with spectroscopic applications, such as Czerny-Turner spectrometers, in near-Littrow configuration, where the diffracted beam encloses a small angle with the incident beam. Diffraction gratings operating in low order and at a high angle of incidence could be used to efficiently wavelength-tune diode lasers in telecommunication systems.

Accordingly, the spirit and scope of the present invention is to be limited only by the following claims.

What is claimed is:

1. Grating device for efficient operation at an angle of incidence different from a blaze angle, the grating device comprising:
   a grating structure having grating facets and a grating period,
   a multilayer dielectric coating disposed at least on the grating facets and having layers alternating between a first and second refractive index,
   wherein twice the grating period is substantially identical to the wavelength of the diffracted light beam times the order of diffraction, and
   wherein the optical thickness of two successive layers of the multilayer dielectric coating at the angle of incidence is selected to be substantially identical to one half of the wavelength of the diffracted light beam.

2. The grating device of claim 1, wherein the grating structure is a triangular grating structure.

3. The grating device of claim 1, further including a flat section oriented substantially parallel to a major surface of the grating structure, said flat section disposed at an apex defined by adjacent grating facets.

4. The grating device of claim 1, wherein the grating structure is made of a crystalline material.

5. The grating device of claim 4, wherein the grating facets comprise crystal planes of the crystalline material.

6. The grating device of claim 4, wherein the crystalline material is silicon.

7. The grating device of claim 1, wherein the multilayer dielectric coating comprises materials selected from the group consisting of oxides, nitrides, oxinitrides and fluorides of group II, group III and group IV elements.

8. Method for operating an optical grating device in low diffraction order at an angle of incidence substantially different from a blaze angle, the method comprising:

producing a grating structure with the selected blaze angle, with twice a grating period being substantially identical to the wavelength of the diffracted light beam times the order of diffraction, and applying to the grating structure a multilayer dielectric coating having layers alternating between a first and second refractive index, wherein the optical thickness of two successive layers of the multilayer dielectric coating at the angle of incidence is selected to be approximately identical to one half of the wavelength of the diffracted light beam.

9. The method of claim 8, wherein producing said grating structure includes etching a semiconductor wafer to expose natural crystal planes of the wafer.

10. The method of claim 9, wherein the semiconductor wafer comprises silicon.

* * * * *